United States Patent
Mayer et al.

(10) Patent No.: US 6,397,905 B1
(45) Date of Patent: Jun. 4, 2002

(54) APPARATUS FOR METERING AND DISPENSING A LIQUID INTO PACKAGING CONTAINERS

(75) Inventors: Werner Mayer, Wallhausen; Detlef Boertz, Schwaebisch Hall, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/719,678

(22) PCT Filed: Apr. 5, 2000

(86) PCT No.: PCT/DE00/01101
§ 371 (c)(1),
(2), (4) Date: Mar. 16, 2001

(87) PCT Pub. No.: WO00/63076
PCT Pub. Date: Oct. 26, 2000

(30) Foreign Application Priority Data

Apr. 17, 1999 (DE) .......................... 199 17 441

(51) Int. Cl.⁷ .................. B65B 1/30; B65B 3/28; B65B 57/06; B65B 57/14; B67C 3/00
(52) U.S. Cl. .................. 141/192; 141/95; 141/188; 141/198
(58) Field of Search .................. 141/83, 94, 95, 141/192, 198, 188

(56) References Cited

U.S. PATENT DOCUMENTS 5,823,234 A * 10/1998 Boertz .................. 141/67
5,957,171 A * 9/1999 Matsuo .................. 141/83

* cited by examiner

Primary Examiner—Timothy L. Maust
(74) Attorney, Agent, or Firm—Ronald E. Greigg

(57) ABSTRACT

An apparatus for metering and dispensing a liquid into packaging containers (10) has a dispenser device (22) with dispenser heads (23), which communicate via a distributor (30) with a supply container (35). A pressure sensor (32), which ascertains a pressure (P1) prevailing in the liquid, is disposed in the distributor (30). A temperature sensor (27) for detecting the temperature (T) of the liquid is also disposed in at least one line (26) that connects the distributor (30) to a metering valve (25). The sensors (27, 32), communicating with a control device (19), together with weighing devices (17,18) that also communicate with the control device (19), enable exact regulation of the weight of a set-point fill quantity (M) in packaging containers (10). By means of the special disposition of the sensors (27, 32), exact metering of the set-point fill quantity (M) and easy replacement of the supply container (35) are made possible.

5 Claims, 1 Drawing Sheet

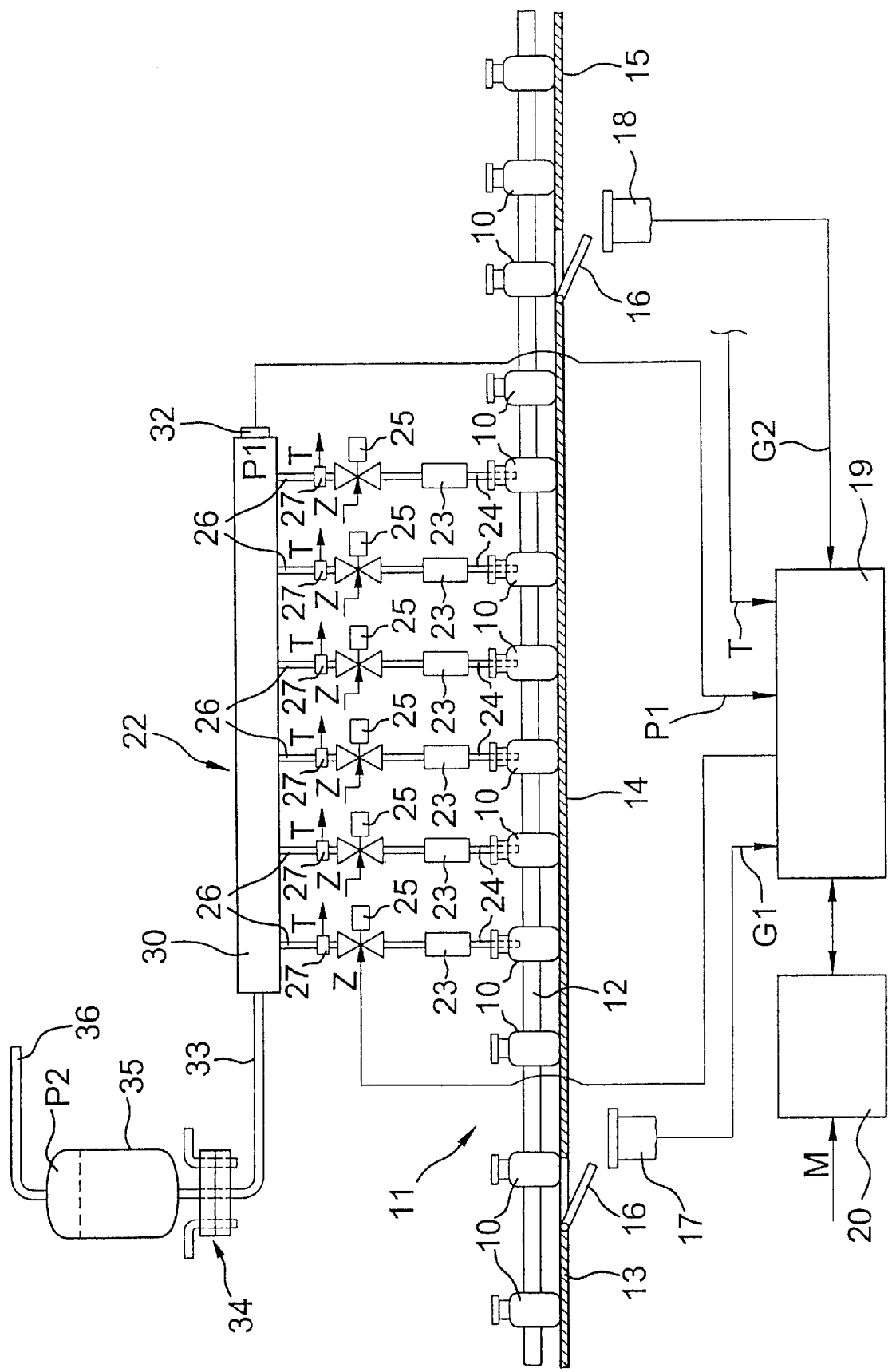

APPARATUS FOR METERING AND DISPENSING A LIQUID INTO PACKAGING CONTAINERS

CROSS-REFERENCE TO RELATED APPLICATIONS

This application is 35 USC 371 Application of PCT/DE 00/00773 filed on Apr. 5, 2000.

The invention relates to an apparatus for metering and dispensing a liquid into packaging containers as generically, of the kind known from European Patent Disclosure EP 0 720 562 B1. In the known apparatus, it is provided that a temperature sensor is optionally disposed in the distributor; it detects the temperature of the liquid to be dispensed and sends the temperature to a control device as an input variable. Especially in the liquids whose viscosity is highly temperature-dependent, the precision of dispensing can thus be increased by means of a suitable variation of the triggering time of the metering valves. However, when relatively small fill quantities are being metered, it has been found that the temperature measurement in the distributor, with regard to a possible change in the triggering times of the metering valves, and thus the precision of dispensing are no longer sufficiently precise. This is because the temperature of the liquid to be dispensed changes along its way from the distributor to the containers, and so a temperature detected in the distributor is not representative for the temperature of the liquid at the time of actual metering.

The object of the invention is therefore to refine a generic apparatus for metering and dispensing a liquid into packaging containers in such a way that when relatively small quantities of liquid are being dispensed (what this means here is especially liquid quantities of less than 10 milliliters), it has greater precision of dispensing.

BRIEF DESCRIPTION OF THE DRAWING

One exemplary embodiment of the invention is shown in the figure, which shows an apparatus for metering and dispensing a liquid into packaging containers in a schematic view, and is explained in further detail in the ensuing description.

The apparatus for metering and dispensing a liquid into packaging containers 10 has a conveyor system 11, with which packaging containers 10, such as am pules or vials, are delivered to successive processing stations. The conveyor system 11 has a feed screw 12 for incremental or continuous feeding of the packaging containers 10. The packaging containers 10 stand upright and slide along rail segments 13–15. Between the rail segments 13 and 14 and the rail segments 14 and 15, there is a respective weighing device 17, 18, triggerable via a selective ejection device 16, each for one packaging container 10; one weighing device (17) detects the tare weight G1 and the other weighing device (18) detects the gross weight G2 of the packaging container 10, and each delivers the respective weight as an input variable to a control device 19. Naturally, the weighing devices 17 and 18 can also be disposed outside the dispensing system instead of inside it.

Product-specific data, such as the course of viscosity of the liquid over the temperature, and data of the apparatus, are stored in memory in the control device 19. Communicating with the control device 19 is an input/output unit 20, by way of which a set-point fill quantity M or a set-point dispensing weight of the packaging containers 10 can in particular be input to the control device 19.

A dispenser device 22 is disposed above the conveyor system 11, in the region of the rail segment 14. In incremental feeding of the packaging containers 10, the dispenser device 22 includes as many dispenser heads 23, for instance six of them, as there are packaging containers 10 to be filled per conveying increment, and each of the dispenser heads has one hollow dispensing needle 24 that can be moved up and down. Each dispenser head 23 is coupled with a respective metering valve 25 for the liquid, which can be triggered individually by the control device 19. The metering valves 25 communicate via short lines 26 with a common tubular distributor 30, in which a liquid pressure P1 prevails. Via a line 33 and a fast-action coupler 34, the distributor 30 communicates in turn with a product supply container 35. The pressure drop between the distributor 30, fully filled with the liquid, and the individual metering valves is always the same, for instance as a result of a disposition of the metering valves 25 at the same vertical spacing from the distributor 30.

The quantity of liquid that is needed during one production shift for filling the packaging containers 10 is advantageously located in the supply container 35. As a result, the fill level in the supply container 35 for each filling cycle decreases only very slightly. The supply container 35 is acted upon by a gas pressure P2 via a pressure line 36.

Advantageously, an influence exists between the pressures P1 and P2, so that P2 is regulated for instance by the control device 19 in such a way that a pressure P1 whose tolerance is ±0.05 bar, for instance, is always established. In this way, different arrangements of the supply container 35 in the apparatus and a dropping liquid level in the supply container 35 can be compensated for.

However, it is also possible to regulate the pressure P2 per se so that it is virtually constant, and as a result the pressure P1 gradually decreases as the liquid level decreases. By means of the pressure P2, in general a higher pressure of the liquid at the metering valves 25 and thus a greater outflow speed from the supply container 35 are made possible, which is favorable to the flow behavior especially in the case of high-viscosity liquids.

A pressure sensor 32 for detecting the liquid pressure P1 is disposed in the distributor 30. The pressure sensor 32 communicates with the control device 19.

It is essential to the invention that in at least one line 26 between the distributor 30 and the associated metering valve 25, there is a temperature sensor 27 for detecting the liquid temperature T prevailing in the line 26. The closer the temperature sensor 27 is placed to the metering valve 25, the more precisely can it determine the temperature T of the liquid at the instant when the liquid flows through the metering valve 25. The temperature sensor 27, which is preferably embodied as a PT 100, thermocouple, or pyrometer, communicates with the control device 19 and carries the temperature T to it as an input variable.

In the exemplary embodiment shown, each of the metering valves 25 is equipped with a separate temperature sensor 27 in its associated line 26. However, it is also possible instead for only single, representatively selected metering valves 25, or one or more groups of metering valves 25, to be equipped with temperature sensors 27. In an individual case, this can be decided on the basis of the existing geometric conditions where the metering valves 25 and lines 26 are installed. Among other factors, different locations of the lines 26, or the movement of lines 26 past heated or cooled components of the apparatus should be taken into account; these can lead to different temperature changes in the liquid along its way from the distributor 30 to the metering valve 25.

The apparatus described above functions as follows; The packaging containers 10 are delivered incrementally to the dispenser device 22 by the feed screw 12. As soon as the packaging containers 10 are in position under the dispenser heads 23 assigned to them, the dispensing needles 24 of the dispenser heads 23 are lowered and introduced into the packaging containers 10. Simultaneously, by means of a suitable triggering of the metering valves 25 by the control device 19, the dispensing of the set-point fill quantity M into the packaging containers 10 begins.

To calculate a triggering time Z for the metering valves 25 for metering the set-point fill quantity M by the control device 19, both the temperature T measured by the temperature sensor or temperature sensors 27 and the pressure P1 ascertained by the pressure sensor 32 are used as a basis. Care must be taken that the pressure P1, measured in the vicinity of the metering valves 25 in the distributor 30, represent a total pressure of the liquid, comprising both the gas pressure P2 and the hydrostatic pressure of the liquid column above the pressure sensor 32. Since the geometry of the apparatus and thus also the pressure drop between the pressure sensor 32 and the metering valves 25 are known and are stored in memory in the control device 19, an exact calculation of the triggering time Z of the metering valves 25 can be made solely using the pressure value P1 and the known shape factors of the metering valves 25 as well as the liquid parameters. In particular, by means of the temperature sensor or sensors 27, the different viscosity at different temperatures T of the liquid is also taken into account in calculating the triggering time Z, and the triggering time Z of the metering valves 25 is adapted accordingly, either individually or in groups.

Once the set-point fill quantity M determined by the triggering time Z has been placed in the packaging containers 10, the dispensing needles 24 are raised back out of the packaging containers 10 by the dispenser heads 23. Next, by means of the feed screw 12, the packaging containers 10 are incrementally delivered to a different processing station, such as a closing station. At the same time, the process as described above is repeated all over again for packaging containers 10 newly conveyed into the apparatus.

In order to control or regulate the exact metering of the fill quantity and thus the set-point fill quantity M through the apparatus, individual packaging containers 10 are taken at random via the selective ejection devices 16 and delivered to the weighing devices 17, 18. The metered fill quantity is calculated by the control device 19 as the difference between the gross weight G2 and the tare weight G1. If defined intervention limits are undershot or exceeded, for instance for the fill quantity, but also for the tare weight G1 of the packaging containers 10, it is possible with the aid of what is known as statistical process control (SPC) to ascertain a suitably corrected triggering time Z of the metering valves 25 from the control device 19. It is understood that instead of two weighing devices 17, 18, it is also possible for only a single weighing device to be used. The weighing device can also be supplied manually with packaging containers 10; what is essential is merely that in this way the fill quantity that has been metered can be determined and delivered to the control device 19.

If the supply container 35 is empty after the end of one production shift, or if a different batch of product is to be used, then by simply decoupling and coupling a different supply container 35, using the fast-action coupler 34, the operational readiness of the apparatus can be restored. The pressure line 36 for the gas pressure P2 need merely be connected to the supply container 35.

In the exemplary embodiment described above, the temperature sensor or sensors 27 have been disposed in the lines 26, without the precise installation site being specified. From the finding that to calculate the triggering time Z of the metering valves 25, if at all possible the exact temperature of the liquid as it flows through the metering valves 25 should be made the basis, then if installation conditions allow it, it follows that the temperature sensor or sensors 27 should be placed as close as possible to the metering valve or valves 25.

The foregoing relates to preferred exemplary embodiments of the invention, it being understood that other variants and embodiments thereof are possible within the spirit and scope of the invention, the latter being defined by the appended claims.

What is claimed is:

1. An apparatus for metering and dispensing a liquid into packaging containers (10), having a product supply container (35), connected to a distributor (30) having a pressure sensor (32), from which distributor connecting lines (26) originate and communicate with fill valves (25), and at least one temperature sensor (27) is positioned in at least one of the connecting lines (26) between the distributor (30) and at least one of the fill valves (25), to sense the temperature (T) of the liquid to be dispensed, and the fill valves (25) are opened and closed, for metering a predetermined fill quantity (M), by a control device (19), wherein the control device has as one input the pressure (P1) sensed by the pressure sensor (32), and another input the temperature (T) sensed by the at least one temperature sensor (27), wherein the control device (19) controls the triggering time (Z) the fill valves are opened so as to dispense the predetermined quantity (M) of liquid to be dispensed.

2. The apparatus of claim 1, wherein the at least one temperature sensor (27) is disposed in the immediate vicinity of the at least one fill valve (25).

3. The apparatus of claim 1, wherein one temperature sensor (27) is disposed in each connecting line (26), so that the triggering time (Z) of each fill valve (25) occurs individually on the basis of the temperature (T) detected by the associated temperature sensor (27).

4. The apparatus of claim 2, wherein one temperature sensor (27) is disposed in each connecting line (26), so that the triggering time (Z) of each fill valve (25) occurs individually on the basis of the temperature (T) detected by the associated temperature sensor (27).

5. The apparatus of claim 1, wherein the supply container (35) is subjected to a gas pressure (P2) which is regulated by the control device (19).

* * * * *